United States Patent
Yoshimura et al.

(12)

(10) Patent No.: US 6,171,381 B1
(45) Date of Patent: Jan. 9, 2001

(54) AQUEOUS METALLIC INK COMPOSITION

(75) Inventors: Yasuyuki Yoshimura; Naoshi Murata; Kenichi Shibuya; Kaoru Matsumoto, all of Osaka (JP)

(73) Assignee: Sakura Color Products Corporation, Osaka (JP)

( * ) Notice: Under 35 U.S.C. 154(b), the term of this patent shall be extended for 0 days.

(21) Appl. No.: 09/110,684

(22) Filed: Jul. 7, 1998

(30) Foreign Application Priority Data

| Jul. 8, 1997 | (JP) | 9-199340 |
| Sep. 4, 1997 | (JP) | 9-257635 |
| Oct. 27, 1997 | (JP) | 9-311170 |
| Apr. 22, 1998 | (JP) | 10-129534 |

(51) Int. Cl.$^7$ .......................... C09D 11/02; C09D 11/10; C09D 11/14
(52) U.S. Cl. ................. 106/31.6; 106/31.68; 106/31.69; 106/31.7; 106/31.71; 106/31.95
(58) Field of Search ............... 106/31.68, 31.69, 106/31.7, 31.71, 31.95, 31.6

(56) References Cited

U.S. PATENT DOCUMENTS

| 4,180,407 | * | 12/1979 | Gibson et al. | 106/31.69 |
| 5,302,195 | * | 4/1994 | Helbrecht et al. | 106/31.36 |
| 5,474,603 | * | 12/1995 | Miyashita et al. | 106/31.7 |
| 5,753,021 | * | 5/1998 | Martin | 106/31.68 |

FOREIGN PATENT DOCUMENTS

199108 * 8/1996 (JP) .

OTHER PUBLICATIONS

English translation of JP08/199108, Aug. 1996.*
Derwent abstract of JP09/249844, Sep. 1997.*
Derwent abstract of JP08/199108, Aug. 1996.*

* cited by examiner

Primary Examiner—Helene Klemanski
(74) Attorney, Agent, or Firm—Armstrong, Westerman, Hattori, McLeland & Naughton

(57) ABSTRACT

The present invention relates to an aqueous metallic ink composition having utility in ink for writing instruments, for printing, for coating, and the like. The composition includes a metallic powder pigment, a colorant, water, and a water-soluble organic solvent, and further includes a natural polysaccharide and at least one compound selected from cellulose derivatives, a cyclodextrin, cyclodextrin derivatives, a water-soluble soy polysaccharide, and water-soluble soy polysaccharide derivatives. In case that an anionic polymer is added as a pigment dispersant into the aqueous metallic pigment composition, the pH value is adjusted to 8.0–10.

16 Claims, No Drawings

AQUEOUS METALLIC INK COMPOSITION

BACKGROUND OF THE INVENTION

1. Field of the Invention

The present invention provides an aqueous metallic ink composition. More particularly, the aqueous metallic ink composition of the invention has utility in the ink for writing instruments, for printing, for coating, and the like.

2. Description of Related Arts

It has been a conventional practice to prepare an aqueous metallic ink composition by adding to an aqueous solution with a metallic powder pigment and a colorant, a water-soluble organic solvent, if required, and a water-soluble resin as a bonding agent (a binder resin), a viscosity controlling agent, or a dispersant, and the like. For example, Japanese Unexamined Patent Publication No.8-199108 (1996) discloses an aqueous ink composition for ball-point pens comprising a metallic powder pigment, a resin, a specific compound capable of providing lubricity, a water-soluble organic solvent, and water. In this report, the resin is used as the bonding agent (the binder resin) and the viscosity controlling agent. The binder resin includes, for example, a water-soluble acrylic resin, an acrylic emulsion and the like. Examples of thickening agents include a microbial polysaccharide or derivatives thereof such as xanthan gum or dextran, a water-soluble vegetable polysaccharide or derivatives thereof, and a water-soluble seaweed polysaccharide or derivatives thereof, water-soluble cellulose derivatives, and a water-soluble synthetic polymer. Frequently, an anionic polymer such as the acrylic resin is used as a pigment dispersant.

However, when the aqueous metallic ink composition containing the conventional water-soluble resin is used for coating (writing or printing) on an absorbent surface (the surface capable of absorbing aqueous ink or being penetrated by aqueous ink) such as a paper (for example, a paper for copy), the pigment (the colorant) penetrates into the paper and the density of the color development at the ink film such as prints or images decreases with the passage of time (for example, from the moment of writing to a few minutes after writing). Also the problem arises that the ink film such as prints or images blurs easily. At the same time, the ink film fixability to a nonabsorbent surface (the surface which neither absorbs the aqueous ink nor be penetrated by the aqueous ink) is low. Moreover, using only the cellulose derivative as a water-soluble resin, the dispersibility falls off because of gelation. These ink compositions have low viscosity stability with time, so the viscosity increases or decreases after storage. Therefore, it is difficult to keep the adequate viscosity for a long time. Accordingly, it is difficult to control the viscosity of the ink composition for each purpose.

The anionic polymer as the pigment dispersant also may cause a viscosity change of the ink (such as an increase of the viscosity) with aggregation or precipitation. The metallic powder pigment (particularly, an aluminum powder pigment) tends to ionize in the ink and the pH of the ink changes because of the ion element which is produced by the metallic powder pigment. Specifically, when the pH of the ink decreases, the aggregation or the precipitation of the anionic polymer changes the viscosity of the ink. Furthermore, the change of the viscosity, which is caused by the aggregation or the precipitation of the anionic polymer in the ink, is often the increase of the viscosity. Accordingly, the writing characteristic deteriorates in some cases.

Thus, the conventional aqueous metallic ink composition has problems in that the density of color development at the ink film decreases while the viscosity stability with time is low.

SUMMARY OF THE INVENTION

The present invention provides an aqueous ink composition comprising a metallic powder pigment, a colorant, water and a water-soluble organic solvent, and further including a natural polysaccharide and at least one compound selected from the group consisting of cellulose derivatives, a cyclodextrin, cyclodextrin derivatives, a water-soluble soy polysaccharide and water-soluble soy polysaccharide derivatives.

As a result of intensive study to solve the foregoing problems, the present inventors completed the invention by finding that in case that an aqueous metallic ink composition comprising at least a metallic powder pigment, a colorant, water, and a water-soluble organic solvent, and further including a natural polysaccharide and cellulose derivatives is used, the stability with time to the density of the color development at an ink film is increased, and the ink film fixability to nonabsorbent surface is improved. The present invention provides an aqueous ink composition comprising at least a metallic powder pigment, a colorant, water, and a water-soluble organic solvent, and further including natural polysaccharide and cellulose derivatives. The aqueous metallic ink composition of the invention comprises both the natural polysaccharide and cellulose derivatives so that the colorant has difficulty in penetrating into the absorbent surface (such as drawing paper). Therefore, the decrease of the density of the color development at the ink film can be restrained. The metallic powder pigment is coated by cellulose derivatives which are used together with the natural polysaccharide so that cellulose derivatives can act effectively on the metallic powder pigment. That is, a carboxyl group and/or a hydroxyl group of cellulose derivatives acts on the metallic powder pigment and a hydrophilic characteristic of the metallic powder pigment increases. Then, the intimacy (linkage) between the metallic powder pigment and the colorant becomes strong. As a result, the colorant is caught or adsorbed by the metallic powder pigment, and then the absorption of the colorant into the absorbent surface is restrained. Moreover, because the composition comprises the natural polysaccharide and cellulose derivatives, the ink film fixability to the nonabsorbent surface (for example, the surface of art paper) is improved. The cause of these phenomena appears to be that a carboxyl group and/or a hydroxyl group of cellulose derivatives are linked with the nonabsorbent surface by a hydrogen bond. Accordingly, because the aqueous metallic ink composition of the invention comprises the natural polysaccharide and cellulose derivatives, the decrease of the density of the color-development at the ink film can be restrained and the ink film fixability to the nonabsorbent surface is excellent. Also, the presence of natural polysaccharide and cellulose derivatives enables control of the viscosity of the aqueous metallic ink composition and improves the dispersibility in a high degree. The cause of these phenomena appears to be that the metallic powder pigment is coated by cellulose derivatives so that the influence of a metallic ion on the natural polysaccharide can be restrained or prevented by controlling the elution of metallic ion into the ink composition. Even though the composition contains cellulose derivatives, the aqueous metallic ink composition has high stability to the dispersion because cellulose derivatives are used with the natural polysaccharide.

In accordance with another embodiment of the invention, and as a result of intensive study, the inventors completed the invention by discovering that in case that aqueous metallic ink compositions comprising at least a metallic powder pigment, a colorant, water, and a water-soluble organic solvent, and further including both a natural polysaccharide and a cyclodextrin or cyclodextrin derivatives is used, the stability with time to the density of the color development is improved, and the viscosity change of the ink after storage is restrained or prevented. The present invention provides an aqueous ink composition, comprising at least a metallic powder pigment, a colorant, water, and a water-soluble organic solvent, and further including a natural polysaccharide and a cyclodextrin or cyclodextrin derivatives.

This aqueous metallic ink composition contains both the natural polysaccharide, and the cyclodextrin or cyclodextrin derivatives, and in this composition, the metallic powder pigment is coated by the cyclodextrin or cyclodextrin derivatives so that the colorant has difficulty in penetrating into the absorbent surface (such as drawing paper). Thus, the decrease in the density of the color development at the ink film can be restrained. The metallic powder pigment preferably is coated by the cyclodextrin or cyclodextrin derivatives, which is used together with the natural polysaccharide so that the cyclodextrin or cyclodextrin derivatives can act effectively on the metallic powder pigment. That is, a hydroxyl group of the cyclodextrin or cyclodextrin derivatives acts on the metallic powder pigment and a hydrophilic characteristic of the metallic powder pigment increases. Then, the intimacy (linkage) between the metallic powder pigment and the colorant becomes strong. As a result, the colorant is caught or adsorbed by the metallic powder pigment, and then the absorption of the colorant into the absorbent surface is restrained. The aqueous metallic ink composition of the invention has an excellent dispersibility (especially, dispersibility of the metallic powder pigment), and an excellent viscosity stability with time. The cause of these phenomena appears to be that the metallic powder pigment is coated by the cyclodextrin or cyclodextrin derivatives so that the influence of a metallic ion on the natural polysaccharide can be restrained or prevented by controlling the elution of the metallic ion into the ink composition. Accordingly, the aqueous metallic ink composition of the invention can restrain the decrease in the density of the color development and maintain the high viscosity stability of the ink composition because it contains both the natural polysaccharide, and the cyclodextrin or cyclodextrin derivatives.

In accordance with another embodiment of the invention, and as a result of intensive study, the inventors completed the invention and discovered that in case that an aqueous metallic ink composition comprising at least a metallic powder pigment, a colorant, water, and a water-soluble organic solvent, and further including both a natural polysaccharide and a water-soluble soy polysaccharide or water-soluble soy polysaccharide derivatives is used, the stability with time to the density of the color development is increased, and the change of the viscosity of the ink after storage is restrained or prevented. The present invention provides an aqueous metallic ink composition, comprising at least a metallic powder pigment, a colorant, water, and a water-soluble organic solvent, and further including a natural polysaccharide, and a water-soluble soy polysaccharide or water-soluble soy polysaccharide derivatives.

This aqueous metallic ink composition contains both the natural polysaccharide and the water-soluble soy polysaccharide or water-soluble soy polysaccharide derivatives so that the colorant has difficulty in penetrating into the absorbent surface (such as a drawing paper) and the decrease of the density of the color development at the ink film can be restrained. The metallic powder pigment preferably is coated by the water-soluble soy polysaccharide or water-soluble soy polysaccharide derivatives which are used together with the natural polysaccharide, so that the water-soluble soy polysaccharide or water-soluble soy polysaccharide derivatives can act effectively on the metallic powder pigment. That is, the water-soluble soy polysaccharide or water-soluble soy polysaccharide derivatives easily absorb to or link by hydrogen bond to the surface of the metallic powder pigment and the surface of the colorant, and the water-soluble soy polysaccharide or water-soluble soy polysaccharide derivatives attaches the colorant to the metallic powder pigment. As a result, a writing portion with a vivid metallic color can be obtained. The aqueous metallic ink composition of the invention has the ability to restrain the change of the viscosity and to maintain the viscosity stability of the ink composition with time because of containing the water-soluble soy polysaccharide or water-soluble soy polysaccharide derivatives.

In accordance with another embodiment of the invention, and as a result of intensive study, the inventors completed the invention and discovered that in case that the pH of the ink is adjusted in an aqueous metallic ink composition containing a metallic powder pigment, a colorant, and an anionic polymer, the change of the viscosity of the ink after storage can be restrained or prevented. The present invention provides an aqueous metallic ink composition comprising a metallic powder pigment, a pigment, and an anionic polymer, and the pH value of the ink composition is maintained within the range of 8.0 to 10.

In the aqueous metallic ink composition of the invention, though the anionic polymer is used as a pigment dispersant, the viscosity change of the ink after storage can be restrained or prevented because the pH is adjusted to a specific degree. The anionic polymer tends to aggregate or precipitate because of being anionic when the ink is acidic or weak alkali (when the pH is less than 8). Even though the ink is alkali, when an alkalinity is too strong (when the pH is more than 10), the metallic powder pigment is changed to a metallic hydroxide (especially, an aluminum powder pigment to a hydroxide aluminum), and the metallic luster of the ink disappears. Accordingly, the ink composition of the invention has a pH in the specific range so that the viscosity of the ink is restrained for a long time and its viscosity stability with time is excellent. Moreover the stability of the metallic powder pigment can be maintained for a long time.

An object of the present invention therefor is to provide an aqueous metallic ink composition which assures the stability to density of color development with time at the ink film, while at the same time restraining the decrease of the density of color development at the ink film.

Another object of the present invention is to provide an aqueous metallic ink composition which is superior in the viscosity stability of the ink composition during storage.

DETAILED DESCRIPTION OF THE PREFERRED EMBODIMENTS

Natural Polysaccharide

Natural polysaccharides applicable to the present invention can be selected from a microbial polysaccharide or derivatives thereof, a water-soluble vegetable polysaccharide or derivatives thereof, a water-soluble animal polysaccharide or derivatives thereof.

Examples of microbial polysaccharides or derivatives thereof useful in the invention include pullulan, xanthan gum, weran gum, rhamzan gum, succinoglucan, and dextran. Examples of water-soluble vegetable polysaccharides or derivatives thereof useful in the invention include tragacanth gum, guar gum, tara gum, locust bean gum, gade gum, arabinogalactan gum, gum arabic, quince seed gum, pectin, starch, sayrumseed gum, carrageenan, alginic acid and agar. Examples of water-soluble animal polysaccharides or the derivatives thereof useful in the invention include for example, gelatin and casein.

Preferable natural polysaccharides include the microbial polysaccharides or derivatives thereof, particularly xanthan gum, weran gum, or rhamzan gum as pseudo plasticity formation agent. As xanthan gum, "KELZAN" (trade name of the product from Sansho Inc.) is suitable. As weran gum, "K1A96" (trade name of the product from Sansho Inc.) is suitable. As rhamzan gum, "K7C233" (trade name of the product from Sansho Inc.) is suitable.

The natural polysaccharide may be used either alone or as a mixture. The amount of the natural polysaccharide preferably is from 0.01% by weight to 4% by weight; more preferably, from 0.3% by weight to 2% by weight, relative to the total amount of the aqueous metallic ink composition. If the content of the natural polysaccharide is less than 0.01% by weight relative to the total amount of the ink composition, the dispersibility of the metallic powder pigment, particularly the dispersibility of the aluminum powder pigment lowers and the aluminum powder pigment may precipitate. On the other hand, If the content of the natural polysaccharide is greater than 4% by weight, the viscosity of the ink composition increases and the writing characteristic and the suitability for printing deteriorate.

Cellulose Derivative

A feature of the aqueous metallic ink composition of the invention that contains the natural polysaccharide and cellulose derivatives is the combination of the natural polysaccharide and cellulose derivatives. The combination is capable of preventing the colorant of the metallic ink composition from penetrating into the absorbent surface while improving the fixability to the nonabsorbent surface. Moreover, the dispersibility of the ink composition is excellent.

Examples of suitable cellulose derivatives used in the invention include methyl cellulose, hydroxyethyl cellulose, hydroxypropyl cellulose, hydroxypropylmethyl cellulose, hydroxypropylethyl cellulose, carboxymethyl cellulose and salts thereof (such as sodium salt and ammonia salt). Preferable cellulose derivatives include carboxymethyl cellulose or salts thereof, and hydroxyethyl cellulose; more preferable include carboxymethyl cellulose and salts thereof (such as sodium salt and ammonia salt). These cellulose derivatives, particularly carboxymethyl cellulose or salts thereof have a remarkable effect on the metallic powder pigment, particularly the aluminum powder pigment (as above mentioned, the effect which improves the hydrophilic characteristic of the metallic powder pigment, particularly the aluminum powder pigment).

The number-average molecular weight of cellulose derivatives is not particularly limited, but preferably, the molecular weight is from 8,000 to 400,000; and more preferably, from 10,000 to 100,000.

Cellulose derivatives may be used either alone or as a mixture. The amount of cellulose derivatives to be used preferably is from 0.01% by weight to 40% by weight; more preferably from 0.3% by weight to 20% by weight, relative to the total amount of the ink composition. If the content of cellulose derivatives is less than 0.01% by weight relative to the total amount of the ink composition, the fixability of the colorant to the aluminum powder pigment lowers, and the decrease of the density of the color development at the ink film is difficult to control. On the other hand, if the content is greater than 40% by weight, the metallic powder pigment, particularly the aluminum powder pigment tends to aggregate, and the viscosity may be easily changed (for example increase of the viscosity).

Cyclodextrin and Cyclodextrin Derivatives

One feature of the aqueous metallic ink composition containing the natural polysaccharide, and the cyclodextrin or cyclodextrin derivatives is the combination of the natural polysaccharide and the cyclodextrin or cyclodextrin derivatives. The combination is capable of preventing the colorant of the metallic ink composition from penetrating into the absorbent surface while improving the viscosity stability of the ink composition.

Applicable to the present invention as cyclodextrin or cyclodextrin derivatives are exemplified as follows; α-cyclodextrin, β-cyclodextrin, γ-cyclodextrin, alkyl derivatives of these cyclodextrin, maltosylcyclodextrin, and glucosylcyclodextin, and the like. The cyclodextrin or cyclodextrin derivatives may be used either alone or as a mixture.

Alkyl derivatives of cyclodextrin(α-cyclodextrin, β-cyclodextrin, γ-cyclodextrin) include, for example, methyl derivatives of cyclodextrin like 2,6-dimethyl-β-cyclodextrin, and 2,3,6-trimethyl-β-cyclodextrin.

Preferable cyclodextrin or cyclodextrin derivatives include at least one compound selected from the group consisting of α-cyclodextrin, β-cyclodextrin, γ-cyclodextrin and derivatives of these cyclodextrin. More preferable compounds include α-cyclodextrin, a compound of α-cyclodextrin and β-cyclodextrin and/or γ-cyclodextrin (for example, a compound of α-cyclodextrin, β-cyclodextrin and γ-cyclodextrin). This compound of the cyclodextrin (the compound of α-cyclodextrin and β-cyclodextrin and/or γ-cyclodextrin) should contain at least α-cyclodextrin. The amount of α-cyclodextrin to be contained is more than 30% by weight (preferably, more than 50% by weight) relative to the total amount of the compound. The amount of cyclodextrin or derivatives thereof to be used is from 0.1% by weight to 40% by weight; and more preferably from 0.3% by weight to 20% by weight relative to the total amount of the ink composition. If the content of the cyclodextrin or cyclodextrin derivatives is less than 0.01% by weight relative to the total amount of the ink composition, the fixability of the colorant to the metallic powder pigment lowers and the decrease of the density of the color development at the ink film is hard to control. On the other hand, if the content is greater than 40% by weight, the metallic powder pigment aggregates, and the viscosity may be easily changed (increased, for example).

Water-soluble Soy Polysaccharide

As stated above, the water-soluble soy polysaccharide and water-soluble soy polysaccharide derivatives may be added as the binder component for the metallic powder pigment and the colorant in order to enable the colorant to fix on the metallic powder pigment, particularly on the aluminum powder pigment. The water-soluble soy polysaccharide or water-soluble soy polysaccharide derivatives restrain the viscosity change caused by the natural polysaccharide so that they assure the viscosity stability.

The water-soluble soy polysaccharide or water-soluble soy polysaccharide derivatives are one of the main components of a water-soluble hemicellulose. In the present invention, it is also possible to use the water-soluble hemicellulose comprising water-soluble soy polysaccharide. The water-soluble hemicellulose is normally made from a hull of oil seed (such as soy beans, palm, coconut, corn and cotton seed) after removing its fats and oils, or protein; or from a scum of grain (such as wheat) after removing its starch. Such ingredients are heated and deconstructioned at a temperature of preferably 80–130° C., more preferably at 100–130° C., under a specific pH condition; that is, between acid and alkali, preferably near the isoelectric point of each protein. As a result, a water-soluble fraction is separated. Then, the water-soluble fraction is dried, or dried after its hydrophobic substances or monomeric substance are removed with an activated carbon treatment, or an absorption treatment by resin or a precipitation treatment by ethanol to obtain the water-soluble hemicellulose. In case of using soybeans as ingredients, the "OKARA", which is obtained as a by-product when producing a bean curd, soybean milk or separated soybean protein, may preferably be used to produce hemicellulose.

Examples of water-soluble soy polysaccharides or derivatives thereof to be used in the present invention include galactose, arabinose, galacturonic acid, rhamnose, xylose, fucose, glucose, in combination with various saccharides. These examples appear to have a construction as follows wherein a galactan and an arabinan are bound to a chain of a rhamno-galacturonic acid.

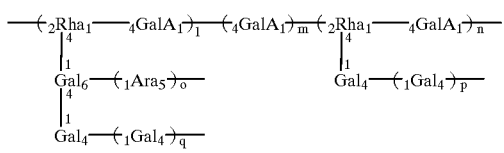

Rha: rhamnose
Ara: arabinose
GalA: rhamno-galacturonic acid
Gal: galactose

The water-soluble soy polysaccharide or water-soluble soy polysaccharide derivatives which are commercialy available are also applicable to the present invention. Specific examples of preferable water-soluble soy polysaccharides or water-soluble soy polysaccharide derivatives include those commerciealy available from Fuji Oil co, Ltd. under the trade names of "SOYAFIVE S-DN", "SOYAFIVE S-DA100", "SOYAFIVE S-LN", "SOYAFIVE S-LN1", "SOYAFIVE S-LA200", and the like. The amount of the water-soluble soy polysaccharide or water-soluble soy polysaccharide derivatives to be used preferably is from 0.5% by weight to 20% by weight; and more preferably from 1% by weight to 15% by weight, relative to the total amount of the ink composition. If the content of the water-soluble soy polysaccharide or water-soluble soy polysaccharide derivatives is greater than 20% by weight relative to the total amount of the ink composition, the viscosity of the ink composition increases and the writing characteristic and the printing suitability deteriorate. On the other hand, if the content is less than 0.5% by weight, the fixability of the colorant to the metallic powder pigment (particularly to the aluminum powder pigment) lowers and it is difficult to form a written portion with vivid metallic color. The water-soluble soy polysaccharide or water-soluble soy polysaccharide derivatives may be used either alone or as a mixture.

Metallic Powder Pigment

Applicable to the present invention as the metallic powder pigment, is one having metallic luster and high dispersibility to water. Both the leafing type and non-leafing type are applicable. The type of metallic powder pigment is not particularly limited. For example, a brass powder pigment or an aluminum pigment is applicable; and particularly the aluminum powder pigment is preferable. By using the aluminum powder pigment, the foregoing effect of the natural polysaccharide and cellulose derivatives, and the effect of the natural polysaccharide and the cyclodextrin or the cyclodextrin derivatives exhibit remarkably. Examples of brass powder pigments include such as "BS-605" (trade name of product from Toyo Aluminum Inc.), "BS-607" (trade name of product from Toyo Aluminum Inc.), "BRONZE POWDER-P-555" (trade name of product from Nakajima Metallic Powder Co., Ltd) and "BRONZE POWDER-P-777" (trade name of product from Nakajima Metallic Powder Co., Ltd).

Examples of aluminum powder pigments include such as "ALPASTE WJP-U75C" (trade name of product from Toyo Aluminum Inc.), "ALPASTE WE1200" (trade name of product from Toyo Aluminum Inc.) "ALPASTE WXM7675" (trade name of product from Toyo Aluminum Inc.) "ALPASTE WXM0630" (trade name of product from Toyo Aluminum Inc.) "1110W" (trade name of product from Showa Aluminum Inc.) "2172SW" (trade name of product from Showa Aluminum Inc.) "AW-808C" (trade name of product from Asahi Kasei Inc.) and "AW-7000R" (trade name of product from Asahi Kasei Inc.).

The average particle diameter of particle in the metallic powder pigment (the brass powder pigment and the aluminum powder pigment) preferably is from 5 $\mu$m to 30 $\mu$m, and more preferably may be from 5 $\mu$m to 15 $\mu$m. When the average particle diameter of particle in the metallic powder pigment (the brass powder pigment and the aluminum powder pigment) is in this range, particularly from 5 $\mu$m to 15 $\mu$m, the writing characteristic and the suitability for printing are excellent.

The metallic powder pigment (the brass powder pigment and the aluminum powder pigment) may be used either alone or as a mixture. The amount of the metallic powder pigment (the brass powder pigment and the aluminum powder pigment) to be used preferably is from 3% by weight to 30% by weight; and more preferably, from 4% by weight to 15% by weight, relative to the total amount of the ink composition. If the content of the metallic powder pigment is less than 3% by weight relative to the total amount of the ink composition, the metallic luster is difficult to exhibit. On the other hand, if the content is greater than 30% by weight, the viscosity and the fluidity of the ink composition are changed because of the increase of the solid content. As a result, the writing characteristic deteriorates with the increase of viscosity or the fall of the fluidity.

Colorant

The colorant (such as a pigment) to be used in the present invention is not particularly limited as long as the colorant has good dispersibility to an aqueous ink. Accordingly, the colorant may be a water-soluble colorant. Applicable as colorants are inorganic pigments and organic pigments.

More concretely, examples of colorants include a pigment, a dye, and a pigment which is prepared by coloring or dying a plastic pigment with a pigment or a dye. Examples of pigments to be used include the organic pigment such as phthalocyanine-series, threne-series, azo-series, quinacridone-series, anthoraquinonoid-series, dioxazine-series, indigoid-series, thioindigoid-series, perinone-series, perylene-series, isoindolinone-series, azomethine-series, the inorganic pigment such as oxide titanium, zinc white, oxide iron, carbon black, a fluorescent pigment, etyrene-bis-malanine, and etyrene-bis-melamine derivative, and the like.

The colorant such as a pigment may be used either alone or as a mixture. The amount of the colorant to be used such as a pigment preferably is from 0.05% by weight to 15% by weight for example; and more preferably from 1% to 10% by weight, relative to the total amount of the ink composition. If the content of the colorant such as a pigment is less than 0.05% by weight relative to the total amount of the ink composition, the color development decreases and it is difficult to obtain the ink film with metallic tone when combining the colorant with the metallic powder pigment. On the other hand, if the content is greater than 15% by weight, the viscosity and the fluidity of the ink composition are changed because of the increase of the solid content. As a result, the writing characteristic deteriorates with the increase of viscosity or the fall of the fluidity.

Water

The commonly used water in this field (for example, ion exchange water, distilled water, and the like) can be used without any problem.

The amount of water to be used is not particularly limited and may vary depending on the target viscosity of the ink composition and series or amount of the other ingredients (such as the natural polysaccharide, the cellulose derivatives, the cyclodextrin or the cyclodextrin derivatives, the metallic powder pigment, the colorant, the water-soluble organic solvent, the anionic polymer, the pH stabilizer, and the thickening agent). The amount of water to be used preferably varies in large range, for example from 1% by weight to 95% by weight; and more preferably, from 20% by weight to 90% by weight relative to the total amount of the ink composition.

Water-soluble Organic Solvent

The water-soluble organic solvent typically is added for prevention against drying up or freezing under low temperature. Applicable to the present invention as the water-soluble organic solvent are glycols, glycol ethers, carbitols and the like. More concretely, Examples of preferable water-soluble organic solvents include glycols (for example, ethylene glycol, diethylene glycol, and propylene glycol), glycol ethers (for example, ethylene glycol monomethyl ether, and the like), the carbitols (for example, diethylene glycol monomethyl ether), glycerin, and trimethylolpropane. The water-soluble organic solvent may be used either alone or as a mixture.

The amount of the water-soluble organic solvent to be used preferably is from 1% by weight to 40% by weight; and more preferably from 5% by weight to 20% by weight relative to the total amount of the ink composition. If the content of the water-soluble organic solvent is less than 1% by weight relative to the total amount of the ink composition, the ink dries easily so that when used in a ball-point pen, clogging occurs frequently and the writing characteristic deteriorates. On the other hand, if the content is greater than 40% by weight, it takes a long time to dry the ink after writing.

Viscosity

The viscosity of the present aqueous metallic ink composition is not particularly limited as long as it remains within the common used range, which means the suitable viscosity for writing or printing while preventing the metallic powder pigment from precipitation.

In the present invention, the viscosity of the aqueous metallic composition preferably is, for example, within the range of from 3,000 cps to 40,000 cps, more preferable from 3,000 cps to 15,000 cps at 20° C. In addition, the viscosity is measured by the viscometer of ELD type, and under the condition that the cone: 3°R14 cone, the rotation speed: 0.5 rpm, the temperature: 20° C.

pH Adjustor

A basic compound such as a compound of inorganic base (hereinafter referred to as "the inorganic base") or a compound of organic base(hereinafter referred to as "the organic base") is applicable as the pH adjustor of the present ink composition.

Applicable as an anionic polymer as stated above, is at least one compound selected from the group consisting of acrylic resins, styrene-acrylic copolymers, maleic acid resins, styrene-maleic copolymers, polyvinyl pyrrolidone, ester-acrylic copolymers, and resins having carboxyl groups.

Using a pH stabilizer is preferable in preparing the present aqueous metallic ink composition. When using the pH stabilizer, the change of pH (the decrease of pH) in the ink can be restrained or prevented during the long-term storage though the metallic powder, particularly the aluminum powder pigment, ionize and isolate. As a result, by using the pH stabilizer, the change of the viscosity of the ink can be restrained or prevented even after the long-term storage.

The benzotriazole or derivatives thereof are applicable as a pH stabilizer in the present invention. The preferred condition of the present aqueous metallic ink composition includes the aqueous metallic ink composition with a thickening agent.

The pH value of the present aqueous metallic ink composition is preferred to be maintained within the range of 8.0 to 10 as mentioned above. Most preferably, the pH is within the range of 8.5 to 9.5. If the pH value of the ink is less than 8.0, the anionic polymer tends to aggregate or precipitate. On the other hand, if the pH value is greater than 10, the metallic powder pigment is changed to hydroxide and the metallic luster of the ink disappears easily.

In order to maintain the pH value of the ink within the foregoing range, it is preferred that the pH value is adjusted a little higher than the foregoing range at the time of preparing the ink composition. If the pH value of the ink is adjusted a little higher at the time of preparing the ink composition as above mentioned, the pH value which provides the excellent viscosity stability with time of the ink can be maintained, even though the pH value decreases a little during storage. Accordingly, in the present invention, the preferable pH value at the time of preparing the ink composition is from 8.3 to 10; and more preferably, from 8.8 to 9.8. More particularly, the preferable pH value is about 9 at the time of preparing the ink composition in the present invention.

Basic Compound

The basic compound for adjusting the pH of the present ink is not particularly limited and a commonly used basic compound is applicable. As a basic compound, the inorganic base and the organic base is applicable for example. The basic compound may be used either alone or as a mixture. The inorganic base is more preferable to be used as a basic compound.

Examples of inorganic bases include a hydroxide of alkaline metal such as a sodium hydroxide and a potassium hydroxide, an alkaline-earth metal such as a calcium hydroxide, and the like. Examples of organic bases to be used include mono-, di- or tri-alkyl amine such as trimetyl amine trimethyl amine, mono-, di- or tri-alcohol amine such as trimethanol amine, triethanol amine, and the like.

The amount of the basic compound to be used is not particularly limited and may vary depending on type or amount of the other ingredients and the target pH value of the ink composition. More concretely, the amount of the basic compound should be within the range which makes the pH value of the ink composition within 8.3 to 10 at the time of preparing the ink composition.

Anionic Polymer

The anionic polymer is used as a resin for pigment dispersant which provides the dispersion stability by preventing the aggregation of the above mentioned pigment and helps forming the ink film. The anionic polymer may be used either alone or as a mixture.

Examples of anionic polymer to be used include acrylic resins, styrene-acrylic copolymers, maleic acid resins, styrene-maleic copolymers, polyvinyl pyrrolidone, ester-acrylic copolymer, and resins having carboxyl group. Examples of preferable anionic polymers include at least one resin selected from the group consisting of acrylic resins, styrene-acrylic copolymers, and maleic acid resins, styrene-maleic copolymers, polyvinyl pyrrolidone. Resins that are neutralized by alkaline metal or modified resins of the above mentioned resins are also included.

The amount of the anionic polymer to be used is not particularly limited. The amount of the anionic polymer preferably is from 0.01% by weight to 5% by weight for example; and preferably from 0.1% by weight to 2% by weight; and more preferably from 0.3% by weight to 1.5% by weight, relative to the total amount of the ink composition. If the content of the anionic polymer to be used is less than 0.01% by weight relative to the total amount of the ink composition, aggregation and precipitation of the pigment tend to occur. On the other hand, if the content is greater than 5% by weight, the increase of the viscosity causes the deterioration of the writing characteristic and the suitability for printing.

Moreover, in the present aqueous metallic ink composition, water-dispersible resins can be used with the above mentioned anionic polymer. Applicable as water-dispersible resins are acrylic-type emulsions, vinyl acetate-type emulsions, urethane-series emulsions and styrene-butadiene-series emulsions.

pH Stabilizer

It is preferable to use a pH stabilizer in the present invention. With using the pH stabilizer which has buffer action (buffer action to the pH change), the pH of the ink can be controlled for a long time. Accordingly, even if ion elements of the metallic powder pigment isolate, the pH change of the ink can be restrained or prevented by the pH stabilizer.

Useful pH stabilizers include 1H-benzotriazole or derivatives thereof. Examples of derivatives of 1H-benzotriazole include 4-methyl-1H-benzotriazole, 5-methyl-1H-benzotriazole, 4-chloro-1H-benzotriazole, 5-chloro-1H-benzotriazole, salts of benzotriazole butyl ester (such as sodium salt, ammonia salt, silver salt), and the like. Preferable pH stabilizers include benzotriazole (1H-benzotriazole) and derivatives thereof.

The pH stabilizer may be used either alone or as a mixture. The amount of the pH stabilizer is not particularly limited. For example, in case of using benzotriazole (1H-benzotriazole) or derivatives thereof, the amount preferably is less than 1.5% by weight; and preferably from 0.01% by weight to 1.0% by weight; more preferably from 0.05% by weight to 0.15% by weight, relative to the total amount of the ink composition. If the content of the pH stabilizer to be used is too small, the buffer action lowers. On the other hand, if the content of the pH stabilizer is greater than 1.5% by weight relative to the total amount of the ink composition, the dissolution of the pH stabilizer or the other components becomes difficult.

Other Additives

To the present aqueous metallic ink composition, the following additives may be added as required: for example, a lubricant, a corrosion prevention, an antiseptic-fungicide agent, a stabilizer for thickening agent, a various surfactant, a moisturizer, anti-foam agent, leveling agent, aggregation prevention, a pH modifier, a pseudo-plasticity formation agent, and the like. For example, as a lubricant, an alkaline metal salt of polyoxyethylene, a dicarboxylic amide (such as a maleic monoamide), a phosphate ester, a N-oleyl sarcosine salt are applicable. As a corrosion prevention, a benzotriazole, a tolyltriazole, a dicyclohexylammonium nitrite are applicable. As an antiseptic-fungicide agent, a benzisothiazoline antiseptic-fungicide agent, a pentachlorophenol antiseptic-fungicide agent, a cresol antiseptic-fungicide agent are applicable. As a dispersant, water-soluble resins such as water-soluble acrylic resins, water-soluble maleic resins, water-soluble styrene-acrylic copolymers and water-soluble styrene-maleic copolymers are applicable.

Method of Producing the Ink Composition

The present aqueous metallic ink composition containing the natural polysaccharide and the cellulose derivative can be obtained by mixing the metallic powder pigment, the colorant, water, the water-soluble organic solvent, the natural polysaccharide and cellulose derivatives in a conventional way. For example, water, the water-soluble organic solvent and the metallic powder pigment (the brass powder pigment or the aluminum powder pigment) are mixed together to prepare a dispersion of the metallic powder pigment. Cellulose derivatives are added therein. The colorant is compounded and dispersed in the resultant dispersion. Then, the natural polysaccharide and various additives, as required, are compounded to obtain the aqueous metallic ink composition. In addition, the colorant may be used in the form of the colorant dispersion which has been dispersed by the dispersant beforehand. By mixing the dispersion of the metallic powder pigment and cellulose derivatives together, the metallic powder pigment can be coated with cellulose derivatives.

The present aqueous metallic ink composition containing both the natural polysaccharide, and the cyclodextrin or the cyclodextrin derivatives can be obtained by mixing the metallic powder pigment, the colorant, water, the water-soluble organic solvent, the natural polysaccharide and the cyclodextrin or cyclodextrin derivatives in a conventional way. For example, water, the water-soluble organic solvent and the metallic powder pigment (the brass powder pigment or the aluminum powder pigment) are mixed together to prepare the dispersion of the metallic powder pigment. The cyclodextrin or cyclodextrin derivatives are added therein. The colorant is compounded and dispersed in the resultant dispersion. Then, the natural polysaccharide and various additives, as required, are compounded to obtain the aqueous metallic ink composition. In addition, the colorant may be used in the form of the colorant dispersion which has been dispersed by the dispersant beforehand. By mixing the dispersion of the metallic powder pigment, and the cyclodextrin or cyclodextrin derivatives together, the metallic powder pigment can be coated with the cyclodextrin or cyclodextrin derivatives.

The present aqueous metallic ink composition containing both the natural polysaccharide and the water-soluble soy polysaccharide or water-soluble soy polysaccharide derivatives can be obtained by mixing the metallic powder pigment, the colorant, water, the water-soluble organic solvent, the natural polysaccharide and the water-soluble soy polysaccharide or water-soluble soy polysaccharide derivatives in a conventional way. For example, water, the water-soluble organic solvent and the metallic powder pigment (the brass powder pigment or the aluminum powder pigment) are mixed together to prepare the dispersion of the metallic powder pigment. The water-soluble soy polysaccharide or water-soluble soy polysaccharide derivatives are added therein. The colorant is compounded and dispersed in the resultant dispersion. Then, the natural polysaccharide and various additives, as required, are compounded to obtain the aqueous metallic ink composition. In addition, the colorant may be used in the form of the colorant dispersion which has been dispersed by the dispersant beforehand. By mixing the dispersion of the metallic powder pigment, and the water-soluble soy polysaccharide or water-soluble soy polysaccharide derivatives together, the metallic powder pigment can be coated with the water-soluble soy polysaccharide or water-soluble soy polysaccharide derivatives.

The present aqueous metallic ink composition containing the anionic polymer can be prepared by mixing the foregoing components (the metallic powder pigment, the pigment, the anionic polymer, the basic compound, water, and as required, the pH stabilizer, the thickening agent, the binder resin for coloring, the water-soluble organic solvent, the resin for pigment dispersion, additives and so on) in a conventional way. For example, the pigment can be dissolved and dispersed in water or the water-soluble organic solvent to prepare the pigment dispersion. Then, water and the water-soluble organic solvent and the metallic powder pigment are compounded to this dispersion and mixed together to prepare the dispersion of the metallic powder pigment. The mentioned binder resin is introduced into the resultant dispersion of the metallic powder pigment as required, so that the binder resin absorbs to the metallic powder pigment. The binder resin to be used in this case is at least one compound selected from the group consisting of cellulose derivatives, the cyclodextrin, cyclodextrin derivatives, the water-soluble soy polysaccharide and water-soluble soy polysaccharide derivatives. Then, after the thickening agent or additives are compounded to the above mentioned pigment dispersion as required, the pH is adjusted by using the basic compound to obtain the aqueous ink with metallic tone.

In addition, as these methods of the preparation of the aqueous metallic ink composition such as dispersion, deaeration, and filtration, the conventional methods are applicable.

The present aqueous metallic ink composition containing the natural polysaccharide and cellulose derivatives has advantages in that the change of the density of the color development at the ink film on the absorbent surface and the ink film fixability to the nonabsorbent surface is excellent. Accordingly, with the present aqueous metallic ink composition, the ink film having the high fixability and the high stability to the density of the color development with time can be formed on both the absorbent surfaces and the nonabsorbent surfaces. This ink composition also has high dispersibility.

On the other hand, the present aqueous metallic ink composition containing both the natural polysaccharide, and the cyclodextrin or cyclodextrin derivatives is capable of restraining the decrease of the density of the color development at the ink film on the absorbent surface. As a result, with this aqueous metallic ink composition, the ink film with the high density of the color development can be formed on both the absorbent surface and the nonabsorbent surface. The viscosity of this ink composition seldom changes over a long time. Therefor, the viscosity can be adjusted according to each purpose (writing or printing) and the suitable viscosity can be maintained for a long time.

In the present invention, when the pH value is adjusted within the range of from 8.0 to 10, even if containing the anionic polymer, the viscosity of the ink is maintained for a long time and the viscosity stability with time is excellent. In addition, the stability to the metallic powder pigment can be maintained for a long time.

As a result, the present aqueous metallic ink composition has the utility as the ink for recording (for example, the ink for printing, writing and inkjet printing) or as the aqueous metallic ink for coating.

EXAMPLES

The present invention will be further detailed by way of examples and comparative examples as follows, though the present invention is not necessarily limited by these examples.

Examples of Aqueous Metallic Ink Compositions Containing a Natural Polysaccharide and Cellulose Derivatives Preparation of Color Pigment Dispersion 1

A colorant (phthalocyanine blue) and a dispersant (styrene-acrylic copolymer), were introduced into ion-exchange water by the ratio of (phthalocyanine blue):(styrene-acrylic copolymer)=5:1 (by weight). The mixture was dispersed with sodium hydroxide by using a ball mill to prepare the pigment dispersion with average particle diameter being 0.08 $\mu$m, the solid content being 10% by weight. The resultant pigment dispersion will be called "pigment base 1" in the following.

Preparation of Color Pigment Dispersion 2

A colorant (isoindoline) and a dispersant (styrene-acrylic copolymer), were introduced into ion-exchange water by the ratio of (isoindoline):(styrene-acrylic copolymer)=5:1 (by weight). The mixture was dispersed with sodium hydroxide by using a ball mill to prepare the pigment dispersion with average particle diameter being 0.15 $\mu$m, the solid content being 10% by weight. The resultant pigment dispersion will be called "pigment base 2" in the following.

Examples 1 to 5, and Comparative Examples 1 to 7

In each of the Examples and Comparative Examples, the components were compounded by the ratio shown in table 1 or 2 (the amount of the each component in the tables 1 and 2 is % by weight), to prepare an ink composition. Concretely, in each Example and Comparative Example, a metallic powder pigment (a brass powder pigment or an aluminum powder pigment) and the mixed solution of ion-exchange water and a water-soluble organic solvent were mixed together for dispersion for one hour at room temperature (20–25° C.). Then, cellulose derivatives were added and the mixture was stirred for another one hour to coat the metallic powder pigment with cellulose derivatives which absorb to the pigment. The pigment base was added to the resultant dispersion and the mixture was stirred for one hour at room temperature (20–25° C.) so that the metallic powder pigment was colored by the absorption of the colorant. After that, a natural polysaccharide and the other additives were compounded into this dispersion of the colored metallic powder pigment and the mixture was stirred for one hour at room temperature (20–25° C.) to obtain the aqueous metallic ink composition.

In addition, as ingredients, the following elements were used; a metallic powder pigment, a natural polysaccharide, a binder resin for coloring such as cellulose derivatives, an antiseptic-fungicide agent, and the like.

Metallic Powder Pigment

Aluminum powder pigment 1: trade name "ALPASTE WXM0630" available from Toyo Aluminum Inc. Leafing type, average particle diameter: about 8 μm Aluminum powder pigment 2: trade name "ALPASTE WXM7675" available from Toyo Aluminum Inc. Nonleafing type, average particle diameter: about 15 μm Brass powder pigment 1: trade name "BS-605" available from Toyo Aluminum Inc.

Brass powder pigment 2: trade name "BS-607" available from Toyo Aluminum Inc.

Natural polysaccharide

Xanthan gum: trade name "KELZAN" available from Sansho Inc.

Weran gum: trade name "K1A96" available from Sansho Inc.

Rhamzan gum: trade name "K7C233" available from Sansho Inc.

Binder Resin for Coloring

Carboxymethyl cellulose 1 ("CMC 1" in the following): trade name "SELOGEN 7A" available from Dai-ichi Kogyo Seiyaku co., Ltd. Number-average molecular weight: 27,000–33,000

Carboxymethyl cellulose 2 ("CMC 2" in the following): trade name "SELOGEN PR" available from Dai-ichi Kogyo Seiyaku co., Ltd. Number-average molecular weight: 47,000–54,000

Hydroxyethyl cellulose ("HEC" in the following): trade name "DAISEL SP550" available from Daicel Chemical Industries, Ltd.

Polyvinyl alcohol: trade name "PVA-117" available from Kuraray co,.Ltd. Number-average molecular weight: 1800

Dextrin: trade name "SE-100" available from Matsutani Chemical Inc. reducing hydrolytic starch Polyacrylic sodium: trade name "JULYMER AC-20N" available from Nihon Jyunyaku Inc.

Stylene-acrylic emulsion("St-A emulsion" in the following): trade name "JOHNCRYL 1535" available from Johnson Polymer Inc.

Acrylic vinyl acetate emulsion("A-Ac emulsion" in the following): trade name "MOVINYL SK-3000" available from Hoechst Inc.

Antiseptic-fungicide Agent 1,2-benzoisothiazoline-3-on: trade name "PROXEL GXL" available from Hoechst Inc.

Corrosion Prevention

Benzotriazole

TABLE 1

| | Examples | | | | |
|---|---|---|---|---|---|
| | 1 | 2 | 3 | 4 | 5 |
| Aluminum powder pigment 1 | 5 | | 5 | | |
| Aluminum powder pigment 2 | | 7 | | | |
| Brass powder pigment 1 | | | | 5 | |
| Brass powder pigment 2 | | | | | 7 |
| Pigment base 1 | 30 | | 30 | | |
| Pigment base 2 | | 40 | | 40 | | 40 |
| Xanthan gum | 0.7 | | | 0.7 | |
| Weran gum | | 0.5 | | | 0.5 |
| Rhamzan gum | | | 0.5 | | |
| CMC 1 | 2 | | | 2 | |
| CMC 2 | | 3 | | | 3 |
| HEC | | | 10 | | |
| Polyvinyl alcohol | | | | | |
| Dextrin | | | | | |
| Polyacrylic sodium | | | | | |
| St-A emulsion | | | | | |
| A-Ac emulsion | | | | | |
| Glycelin | 2.5 | 2.5 | 2.5 | 2.5 | 2.5 |
| Propylene glycol | 1.5 | 1.5 | 1.5 | 1.5 | 1.5 |
| Water | 58.1 | 45.3 | 40.3 | 58.1 | 45.3 |
| Antiseptic-fungicide agent | 0.1 | 0.1 | 0.1 | 0.1 | 0.1 |
| Corrosion prevention | 0.1 | 0.1 | 0.1 | 0.1 | 0.1 |
| Color development test | I | I | I | I | I |
| Fixability test | I | I | I | I | I |

TABLE 2

| | Comparative Examples | | | | | | |
|---|---|---|---|---|---|---|---|
| | 1 | 2 | 3 | 4 | 5 | 6 | 7 |
| Aluminum powder pigment 1 | 7 | | 7 | | | | |
| Aluminum powder pigment 2 | 7 | | 7 | | 7 | | |
| Brass powder pigment 1 | | | | | | | 7 |
| Brass powder pigment 2 | | | | | | 7 | |
| Pigment base 1 | 30 | | 30 | | | 30 | |
| Pigment base 2 | | 40 | | 40 | 40 | | 40 |
| Xanthan gum | | | | | 0.7 | | |
| Weran gum | 0.5 | | 0.5 | | | 0.5 | |
| Rhamzan gum | | 0.5 | | 0.5 | | | 0.5 |
| CMC 1 | | | | | | | |
| CMC 2 | | | | | | | |
| HEC | | | | | | | |
| Polyvinyl alcohol | 10 | | | | | 10 | |
| Dextrin | | 20 | | | | | 20 |
| Polyacrylic sodium | | | 5 | | | | |
| St-A emulsion | | | | 30 | | | |
| A-Ac emulsion | | | | | 30 | | |
| Glycelin | 2.5 | 2.5 | 2.5 | 2.5 | 2.5 | 2.5 | 2.5 |
| Propylene glycol | 1.5 | 1.5 | 1.5 | 1.5 | 1.5 | 1.5 | 1.5 |
| Water | 48.3 | 28.3 | 53.3 | 18.3 | 18.1 | 48.3 | 28.3 |
| Antiseptic-fungicide agent | 0.1 | 0.1 | 0.1 | 0.1 | 0.1 | 0.1 | 0.1 |
| Corrosion prevention | 0.1 | 0.1 | 0.1 | 0.1 | 0.1 | 0.1 | 0.1 |
| Color development test | II | I | II | II | II | II | II |
| Fixability test | III | III | III | III | III | III | III |

Estimate of Ink Composition

Each of those aqueous metallic ink compositions prepared in Examples 1 to 5 and Comparative Examples 1 to 7 was filled in a test tube and allowed to stand for one day at room temperature (20–25° C.). The dispersibility of each composition was evaluated by visual inspection. No segregation (color separation) was inspected in those ink compositions prepared in Examples 1 to 5.

Each of aqueous metallic ink compositions prepared in Examples 1 to 5 and Comparative Examples 1 to 7 was filled in an ink container tube of a ball-point pen. Then, air bubbles of the ink were removed by way of centrifuging to obtain test samples of the ball-point pen. By the color development test and the fixability test with these test samples as follows, the color development and the fixability of the written portion are evaluated. The evaluation results are shown in tables 1 and 2. In addition, as an ink container tube, the ink container tube made of polypropylene for a ball-point pen which has a ball-point tip formed of German silver (the material of ball: hard metal) connected at its edge, was used.

Color Development Test

After those test samples were applied on a black drawing paper (an absorbent surface), the color development at the written portion was evaluated by visual inspection on a following basis.

I : Written portion with excellent metallic luster and rich color of the color pigment II: Written portion without color of the color pigment which has only the color of the aluminum powder pigment.

Fixability Test

After those test samples were applied on a black art paper (a nonabsorbent surface) and dried, the written portion was rubbed once with a lord of 1 kg. The condition of the resultant written portion was evaluated by visual inspection on a following basis.

I: There was no change of the written portion at all between before and after rubbing.

II: A piece of written portion came off after rubbing.

III: Written portion came off totally after rubbing.

In Examples 1 and 4, the blue metallic written portion was obtained and its fixability to nonabsorbent surface was high. In Examples 2, 3 and 5, the gold metallic written portion was obtained and its fixability to nonabsorbent surface was high.

On the other hand, in Comparative Examples 1 and 6, the obtained written portion was without metallic color and its fixability was low. In Comparative Examples 2 and 7, the gold metallic written portion was obtained, but the fixability of the written potion to nonabsorbent surface was low. In Comparative Examples 3 to 5, the obtained written portion was without metallic color and the fixability of the written portion to nonabsorbent surface was not sufficient.

As a result, when using these aqueous ink compositions prepared in Examples 1 to 5, the metallic written portion with high density of color development and excellent fixability to nonabsorbent surface can be obtained.

With the aqueous metallic ink composition of the present invention, the metallic ink film with high density of color development and excellent fixability to nonabsorbent surface can be formed, because it comprises a metallic powder pigment, a colorant, water, a water-soluble organic solvent, a natural polysaccharide and cellulose derivatives. The present ink composition also has high dispersibility.

Moreover, in the present invention, because the metallic powder pigment (the brass powder pigment or the aluminum powder pigment, and the like) is coated by cellulose derivatives, elution of a metallic ion (a copper ion or a aluminum ion, and the like) can be restrained. Accordingly, the effect of the metallic ion on a natural polysaccharide (such as the change of the viscosity for example) can be restrained.

Examples of an Aqueous Metallic Ink Composition Containing a Natural Polysaccharide and a Cyclodextrin or Cyclodextrin Derivatives Preparation of Color Pigment Dispersion 3

A colorant (phthalocyanine blue) and a dispersant (styrene-acrylic copolymer), were introduced into ion-exchange water by the ratio of (phthalocyanine blue):(styrene-acrylic copolymer)=5:1 (by weight). The mixture was dispersed with sodium hydroxide by using a ball mill to prepare the pigment dispersion with average particle diameter being 0.08 $\mu$m, the solid content being 10% by weight. The resultant pigment dispersion will be called "pigment base 3" in the following.

Preparation of Color Pigment Dispersion 4

A colorant (isoindoline) and a dispersant (styrene-acrylic copolymer), were introduced into ion-exchange water by the ratio of (isoindoline):(styrene-acrylic copolymer)=5:1 (by weight). The mixture was dispersed with sodium hydroxide by using a ball mill to prepare the pigment dispersion with average particle diameter being 0.15 $\mu$m, the solid content being 10% by weight. The resultant pigment dispersion will be called "pigment base 4" in the following.

Examples 6 to 11, and Comparative Examples 8 to 14

In each of the Examples and each of the Comparative Examples, the components were compounded by the ratio shown in table 3 or 4 (the amount of each component in the tables 3 and 4 is % by weight), to prepare an ink composition. Concretely, in each Example and Comparative Example, a metallic powder pigment and the mixed solution of ion-exchange water and a water-soluble organic solvent were mixed together for dispersion for one hour at room temperature (20–25° C.). A color adherent resin was added and the mixture was stirred for another one hour to coat the metallic powder pigment with the color adherent resin which absorbed to the pigment. The pigment base was added to the resultant dispersion and the mixture was stirred for one hour at room temperature (20° C.–25° C.) so that the metallic powder pigment was colored by the absorption of the colorant. Then, a natural polysaccharide and the other additives were introduced into the resultant dispersion of the colored metallic powder pigment and the mixture was stirred for one hour at room temperature (20–25° C.) to obtain an aqueous metallic ink composition.

In addition, as ingredients, the following elements were used; a metallic powder pigment, a natural polysaccharide, a color adherent resin such as a cyclodextrin or cyclodextrin derivatives an antiseptic-fungicide agent, and so on.

Metallic Powder Pigment

Aluminum powder pigment 3: trade name "ALPASTE WXM0630" available from Toyo Aluminum Inc. Leafing type, average particle diameter: about 8 $\mu$m Aluminum powder pigment 4: trade name "ALPASTE WXM7675" available from Toyo Aluminum Inc. Nonleafing type, average particle diameter: about 15 $\mu$m Brass powder pigment 3: trade name "BS-605" available from Toyo Aluminum Inc.

Brass powder pigment 4: trade name "BS-607" available from Toyo Aluminum Inc.

Natural Polysaccharide

Xanthan gum: trade name "KELZAN" available from Sansho Inc.

Weran gum: trade name "K1A96" available from Sansho Inc.

Rhamzan gum trade name "K7C233" available from Sansho Inc.

Binder Resin for Coloring

Cyclodextrin 1: trade name "DEXYPEARL α-100" available from Ensuikouseitou Inc. (α-cyclodextrin 100%).

Cyclodextrin 2: trade name "DEXYPEARL K-50" available from Ensuikouseitou Inc. (Mixture of α-, β-, γ-cyclodextrin).

Carboxymethyl cellulose ("CMC" in the following): trade name "SELOGEN PR" available from Dai-ichi Kogyo Seiyaku co., Ltd. Number-average molecular weight: 47,000–54,000

Polyvinyl alcohol: trade name "PVA-117" available from Kuraray co,.Ltd. Number-average molecular weight: 1800

Polyacrylic sodium: trade name "JULYMER AC-20N" available from Nihon Jyunyaku Inc.

Stylene-acrylic emulsion ("St-A emulsion" in the following): trade name "JOHNCRYL 1535" available from Johnson Polymer Inc.

Acrylic vinyl acetate emulsion("A-AcV emulsion" in the following): trade name "MOVINYL SK-3000" available from Hoechst Inc.

Antiseptic-fungicide Agent 1,2-benzoisothiazoline-3-on: trade name "PROXEL GXL" available from Hoechst Inc.

Corrosion Prevention

Benzotriazole

TABLE 3

| | Examples | | | | | |
|---|---|---|---|---|---|---|
| | 6 | 7 | 8 | 9 | 10 | 11 |
| Aluminum powder pigment 3 | 5 | | 5 | | | |
| Aluminum powder pigment 4 | | 7 | | | | |
| Brass powder pigment 3 | | | | 5 | | 5 |
| Brass powder pigment 4 | | | | | 7 | |
| Pigment base 3 | 30 | | | 30 | | |
| Pigment base 4 | | 40 | 40 | | 40 | 40 |
| Xanthan gum | 0.7 | | | 0.7 | | |
| Weran gum | | 0.5 | | | 0.5 | |
| Rhamzan gum | | | 0.5 | | | 0.5 |
| Cyclodextrin 1 | 10 | 20 | | 10 | 20 | |
| Cyclodextrin 2 | | | 15 | | | 15 |
| CMC | | | | | | |
| Polyvinyl alcohol | | | | | | |
| Polyacrylic sodium | | | | | | |
| St-A emulsion | | | | | | |
| A-Ac emulsion | | | | | | |
| Glycelin | 2.5 | 2.5 | 2.5 | 2.5 | 2.5 | 2.5 |
| Propylene glycol | 1.5 | 1.5 | 1.5 | 1.5 | 1.5 | 1.5 |
| Water | 50.1 | 28.3 | 35.3 | 50.1 | 28.3 | 35.3 |
| Antiseptic-fungicide agent | 0.1 | 0.1 | 0.1 | 0.1 | 0.1 | 0.1 |
| Corrosion prevention | 0.1 | 0.1 | 0.1 | 0.1 | 0.1 | 0.1 |
| Color development test | I | I | I | I | I | I |
| Viscosity stability test | I | I | I | I | I | I |

TABLE 4

| | Comparative Examples | | | | | | |
|---|---|---|---|---|---|---|---|
| | 8 | 9 | 10 | 11 | 12 | 13 | 14 |
| Aluminum powder pigment 3 | | 7 | | 7 | | | |
| Aluminum powder pigment 4 | 7 | | 7 | | | | |
| Brass powder pigment 3 | | | | | | | 7 |
| Brass powder pigment 4 | | | | | | 7 | |
| Pigment base 3 | 30 | | 30 | | | 30 | |
| Pigment base 4 | | 40 | | 40 | 40 | | 40 |
| Xanthan gum | | | | | 0.7 | | |
| Weran gum | 0.5 | | 0.5 | | | 0.5 | |
| Rhamzan gum | | 0.5 | | 0.5 | | | 0.5 |
| Cyclodextrin 1 | | | | | | | |
| Cyclodextrin 2 | | | | | | | |
| CMC | 3 | | | | | 3 | |
| Polyvinyl alcohol | | 10 | | | | | 10 |
| Polyacrylic sodium | | | 5 | | | | |
| St-A emulsion | | | | 30 | | | |
| A-Ac emulsion | | | | | 30 | | |
| Glycelin | 2.5 | 2.5 | 2.5 | 2.5 | 2.5 | 2.5 | 2.5 |
| Propylene glycol | 1.5 | 1.5 | 1.5 | 1.5 | 1.5 | 1.5 | 1.5 |
| Water | 55.3 | 38.3 | 53.3 | 18.3 | 18.1 | 48.3 | 26.3 |
| Antiseptic-fungicide agent | 0.1 | 0.1 | 0.1 | 0.1 | 0.1 | 0.1 | 0.1 |
| Corrosion prevention | 0.1 | 0.1 | 0.1 | 0.1 | 0.1 | 0.1 | 0.1 |
| Color development test | I | II | II | II | II | I | II |
| Viscosity stability test | II | I | III | III | III | II | I |

Estimate of Ink Composition

Viscosity Stability Test

Each of those aqueous metallic ink compositions prepared in Examples 1 to 5 and Comparative Examples 6 to 11 was filled in a beaker and allowed to stand for 30 days at 50° C. The change of the viscosity before and after the storage was inspected and the viscosity stability of each composition was evaluated on a following basis. In addition, the viscosity is measured by the viscometer of ELD type, and under the condition that the cone: 3°R14 cone, the rotation speed: 0.5 rpm, the temperature: 20° C.

I: No change of the viscosity was inspected before and after the storage.

II: A little change (increase or decrease) of the viscosity was inspected before and after the storage.

III: A remarkable change (increase or decrease) of the viscosity was inspected before and after the storage.

Color Development Test

Each aqueous metallic ink composition prepared in Examples 6 to 11 and Comparative Examples 8 to 14 was filled in an ink container tube of a ball-point pen, then air bubbles of the ink were removed by way of centrifuging to obtain test samples of the ball-point pen. By the color development test with these test samples as follows, the color development of the written portion is evaluated. The evaluation results are shown in tables 3 and 4. In addition, as an ink container tube, the polypropylene ink container tube for the ball-point pen which has a tip of ball-point pen made of German silver (the material of ball: hard metal) connected at its edge, was used.

After test samples were applied on a black drawing paper (an absorbent surface), the color development at the written portion was evaluated by visual inspection on a following basis.

I: Written portion with excellent metallic luster and rich color of the color pigment II: Written portion without color of the color pigment which has only the color of the aluminum powder pigment.

In Examples 6 to 11, before and after the storage for 30 days at 50° C., the change of the viscosity of the ink composition was hardly observed and the viscosity stability was excellent.

In Examples 6 and 9, the blue metallic written portion with high density of color development was obtained. In Examples 7, 8, 10 and 11, the gold metallic written portion with high density of color development was obtained.

On the other hand, in Comparative Examples 8 and 13, the blue metallic written portion was obtained, but the viscosity stability of the ink composition was low. In Comparative Examples 9 and 14, the viscosity stability of the ink composition was high, but the obtained written portion was without gold metallic color. In Comparative Examples 10 to 12, the obtained written portion was without metallic color and the viscosity stability of the ink composition was low.

As a result, these aqueous ink compositions prepared in Examples 6 to 11 have excellent viscosity stability, and when used, the metallic written portion with high density of the color development can be obtained.

Because the composition comprises a metallic powder pigment, a colorant, water, a water-soluble organic solvent, a natural polysaccharide and a cyclodextrin or cyclodextrin derivatives, the aqueous metallic ink composition of the present invention has excellent viscosity stability and forms the metallic ink film with high density of color development.

Examples of Aqueous Metallic Ink Compositions Containing of a Natural Polysaccharide and a Water-soluble Soy Polysaccharide or Water-soluble Soy Polysaccharide Derivatives Preparation of Color Pigment Dispersion 5

A colorant (phthalocyanine blue) and a dispersant (styrene-acrylic copolymer), were introduced into ion-exchange water by the ratio of (phthalocyanine blue):(styrene-acrylic copolymer)=5:1 (by weight). The mixture was dispersed with sodium hydroxide by using a ball mill to prepare the pigment dispersion with average particle diameter being 0.08 $\mu$m, the solid content being 10% by weight. The resultant pigment dispersion will be called "pigment base 3" in the following.

Preparation of Color Pigment Dispersion 6

A colorant (isoindoline) and a dispersant (styrene-acrylic copolymer), were introduced into ion-exchange water by the ratio of (isoindoline):(styrene-acrylic copolymer)=5:1 (by weight). The mixture was dispersed with sodium hydroxide by using a ball mill to prepare the pigment dispersion with average particle diameter being 0.15 $\mu$m, the solid content being 10% by weight. The resultant pigment dispersion will be called "pigment base 4" in the following.

Examples 12 to 14, and Comparative Examples 15 to 18

In each of the Examples and each of the Comparative Examples, components were compounded by the ratio shown in table 5 (the amount of each component in the table 5 is % by weight), to prepare an ink composition. In each Example and Comparative Example, an aluminum powder pigment and a mixed solution of ion-exchange water and a water-soluble organic solvent were mixed together for dispersion for one hour at room temperature (20–25° C.). A water-soluble soy polysaccharide was added and the mixture was stirred for another one hour to coat the aluminum powder pigment with the water-soluble soy polysaccharide, which absorbed to the pigment. The pigment base was added to the resultant dispersion and the mixture was stirred for one hour at room temperature (20–25° C.) so that the metallic powder pigment was colored by the absorption of the colorant. Then, a natural polysaccharide and the other additives were introduced into the resultant dispersion of the colored aluminum powder pigment and the mixture was stirred for one hour at room temperature (20–25° C.) to obtain an aqueous metallic ink composition.

In addition, as ingredients, the following elements were used; a metallic powder pigment, a natural polysaccharide, a color adherent resin such as a water-soluble soy polysaccharide or water-soluble soy polysaccharide derivatives, an antiseptic-fungicide agent, and so on.

Metallic Powder Pigment

Aluminum powder pigment 5: trade name "ALPASTE WXM0630" available from Toyo Aluminum Inc. Leafing type, average particle diameter: about 8 $\mu$m Aluminum powder pigment 6: trade name "ALPASTE WXM7675" available from Toyo Aluminum Inc. Nonleafing type, average particle diameter: about 15 $\mu$m Natural Polysaccharide Xanthan gum: trade name "KELZAN" available from Sansho Inc.

Weran gum: trade name "K1A96" available from Sansho Inc.

Rhamzan gum: trade name "K7C233" available from Sansho Inc.

Binder Resin for Coloring

Water-soluble soy polysaccharide 1 ("soya polysaccharide 1" in the following): trade name "SOYAFIVE S-DN" available from Fuji Oil co,.Ltd.

Water-soluble soy polysaccharide 2 ("soya polysaccharide 2" in the following): trade name "SOYAFIVE S-DA100" available from Fuji Oil co,.Ltd.

Polyvinyl alcohol ("PVA" in the following): trade name "PVA-117" available from Kuraray co, Ltd. Number-average molecular weight: 1800

Polyacrylic sodium ("polyacrylic Na" in the following): trade name "JULYMER AC-20N" available from Nihon Jyunyaku Inc.

Stylene-acrylic emulsion ("St-A emulsion" in the following): trade name "JOHNCRYL 1535" available from Johnson Polymer Inc.

Acrylic vinyl acetate emulsion ("A-Ac emulsion" in the following): trade name "MOVINYL SK-3000" available from Hoechst Inc.

Antiseptic-fungicide Agent 1,2-benzoisothiazoline-3-on: trade name "PROXEL GXL" available from Hoechst Inc.

Corrosion Prevention

Benzotriazole

TABLE 5

|  | Examples | | | Comparative Examples | | | |
| --- | --- | --- | --- | --- | --- | --- | --- |
|  | 12 | 13 | 14 | 15 | 16 | 17 | 18 |
| Aluminum powder pigment 5 | 5.0 |  | 5.0 | 7.0 |  | 7.0 |  |
| Aluminum powder pigment 6 |  | 7.0 |  |  | 7.0 |  | 7.0 |
| Pigment base 5 | 30.0 |  |  |  | 30.0 |  |  |
| Pigment base 6 |  | 40.0 | 40.0 | 40.0 |  | 40.0 | 40.0 |
| Xanthan gum | 0.7 |  |  |  |  |  | 0.7 |
| Weran gum |  | 0.5 |  |  | 0.5 |  |  |
| Rhamzan gum |  |  | 0.5 | 0.5 |  | 0.5 |  |
| Water-soluble soy polysaccharide 1 | 3.0 | 5.0 |  |  |  |  |  |
| Water-soluble soy polysaccharide 2 |  |  | 5.0 |  |  |  |  |
| PVA |  |  |  | 10.0 |  |  |  |
| Polyacrylic sodium |  |  |  |  | 5.0 |  |  |
| St-A emulsion |  |  |  |  |  | 30.0 |  |
| A-Ac emulsion |  |  |  |  |  |  | 30.0 |
| Glycelin | 2.5 | 2.5 | 2.5 | 2.5 | 2.5 | 2.5 | 2.5 |
| Propylene glycol | 1.5 | 1.5 | 1.5 | 1.5 | 1.5 | 1.5 | 1.5 |
| Antiseptic-fungicide agent | 0.1 | 0.1 | 0.1 | 0.1 | 0.1 | 0.1 | 0.1 |
| Corrosion prevention | 0.1 | 0.1 | 0.1 | 0.1 | 0.1 | 0.1 | 0.1 |
| Water | 57.1 | 43.3 | 45.3 | 38.3 | 53.3 | 18.3 | 18.1 |
| Color development test | I | I | I | III | III | II | II |
| Viscosity stability test | I | I | I | II | III | III | III |

Estimate of Ink Composition

Each aqueous metallic ink composition prepared in Examples 12 to 14 and Comparative Examples 15 to 18 was filled in an ink container tube of a ball-point pen, then air bubbles of the ink were removed by way of centrifuging to obtain test samples of the ball-point pen. By the color development test and the viscosity stability test with these test samples as follows, the color development of the written portion and the viscosity stability of the ink composition were evaluated. The evaluation results are shown in table 5. In addition, as an ink container tube, the polypropylene ink container tube for a ball-point pen which has a tip of ball-point pen made of German silver(the material of ball-:hard metal) connected at its edge, was used.

Color Development Test

After test samples were applied on a black drawing paper (an absorbent surface), the color development at the written portion was evaluated by visual inspection on a following basis.

I: Written portion with excellent metallic luster and rich color of color pigment II: Written portion has a metallic luster with a little developed color of the color pigment, the color of the color pigment appears a little on the developed color of the aluminum powder pigment.

III: Written portion without color of the color pigment which has only the color of the aluminum powder pigment.

Viscosity Stability Test

Each aqueous metallic ink composition prepared in Examples 12 to 14 and Comparative Examples 15 to 18 was filled in a beaker and allowed to stand for 30 days at 50° C. The change of the viscosity before and after the storage was investigated and the viscosity stability of each ink composition was evaluated on a following basis. In addition, the viscosity was measured by the viscometer of ELD type under the condition that the cone: 3°R14 cone, the rotation speed: 0.5 rpm, the temperature: 20° C.

I: No change of the viscosity was inspected before and after the storage.

II: A little change (increase or decrease) of the viscosity was inspected before and after the storage.

III: A remarkable change (increase or decrease) of the viscosity was inspected before and after the storage.

In Example 12, the blue metallic written portion was obtained and no change of the viscosity of the ink composition was inspected. In Examples 13 and 14, the gold metallic written portion was obtained and no change of the viscosity of the ink composition was inspected.

On the other hand, in Comparative Example 15, a little change of the viscosity was inspected and the obtained metallic written portion was without color. In Comparative Example 16, the obtained written portion was without metallic tone and the change of the viscosity was so large that the writing was impossible after the storage of one month. In Comparative Examples 17 and 18, the change of the viscosity was large and the viscosity stability with time of the ink composition was inferior so that writing was impossible after the storage of one month. In the ink compositions prepared in Comparative Examples 17 and 18, the color development was a little better than that of the other Comparative Examples and the slightly colored metallic written portions were obtained. There was, however, a remarkable difference in vividness of the writing portion between Examples 12 to 14 and Comparative Examples 17, 18.

As a result, those aqueous ink compositions prepared in Examples 12 to 14 have the excellent viscosity stability with time, and the metallic written portion with high density of the color development can be obtained.

Because the composition containes a water-soluble soy polysaccharide or water-soluble soy polysaccharide derivatives, the aqueous metallic ink composition of the present invention has the excellent viscosity stability with time and forms the vividly colored metallic ink film.

Examples of an Aqueous Metallic Ink Composition with pH Adjustor

Preparation of Color Pigment Dispersion 7

A colorant (phthalocyanine blue: trade name "FIRST-GENBLUE TGR" from Dainippon ink and Chemicals, inc.) and a resin for pigment dispersion (styrene-acrylic copolymer: trade name "JOHNCRYL J-683" available from Johnson polymer, the average amount of the molecule is about 8,000.) were dissolved in ion-exchange water by the ratio of (phthalocyanine blue):(styrene-acrylic copolymer)= 5:1 (by weight). The mixture was dispersed with triethylamine by using a ball mill to prepare the pigment dispersion with average particle diameter being 0.08 $\mu$m, solid content being 10% by weight. The resultant pigment dispersion will be called "pigment base 7" in the following.

Preparation of Color Pigment Dispersion 8

A colorant (isoindoline: trade name "IRCADIN YELLOW" from Chiba Specialty Chemicals inc.) and a resin for pigment dispersion (styrene-acrylic copolymer: trade name "JOHNCRYL J-683" available from Johnson polymer, the average amount of the molecule is about 8,000.) were dissolved in ion-exchange water by the ratio of (isoindoline):(styrene-acrylic copolymer)=5:1 (by weight). The mixture was dispersed with triethylamine by using a ball mill to prepare the pigment dispersion with average particle diameter being 0.15 μm, the solid content being 10% by weight. The resultant pigment dispersion will be called "pigment base 8" in the following.

Examples 15 to 22

In each of the Examples, components were compounded by the ratio shown in table 6 (the amount of the each component shown in table 6 is % by weight) and the pH value was adjusted to prepare an ink composition. Aqueous metallic ink compositions in Examples 15 to 22 were prepared as follows. The aluminum powder pigment (trade name: "WXM0630" from Toyo Aluminum Inc.) and the mixed solution of ion-exchange water, glycerin, and propylene-glycol were mixed together for dispersion for one hour at room temperature (20–25° C.). Carboxymethyl cellulose (CMC) (trade name: "SELOGEN PR" from Dai-ichi Kogyo Seiyaku co., Ltd, number-average molecular weight is about 47,000–54,000) was added and the mixture was stirred for another one hour to coat the aluminum powder pigment with the binder resin which absorbed to the pigment. The pigment base 7 or 8 was added to the resultant dispersion and the mixture was stirred for one hour at room temperature (20–25° C.) so that the aluminum powder pigment was colored by the absorption of the colorant. Then, the other additives (such as a thickening agent, a pH stabilizer, an antiseptic, a lubricant and a thickening agent stabilizer) were introduced into the resultant dispersion of the colored aluminum powder pigment. The mixture then was stirred for one hour at room temperature (20–25° C.) to obtain an aqueous ink composition. The pH value of the resultant ink was adjusted to 9 by using sodium hydroxide as a basic compound. As a result, an aqueous ink composition with blue or yellow metallic color was obtained.

In addition, as a thickening agent, for example, psuedo-plasticity formation agents such as xanthan gum (trade name: "KELZAN" available from Sansho Inc.), weran gum (trade name: "K1A96" available from Sansho Inc.), rhamzan gum(trade name: "K7C233" available from Sansho Inc.) were used. As a pH stabilizer, benzotriazole, tolyl triazole (4-methyl-benzotriazole) were used.

As an antiseptic-fungicide agent, 1,2-benzoisothiazoline-3-on(trade name "PROXEL GXL" available from Hoechst. Inc.) was used. As a lubricant, maleic monoamide was used and as a thickening agent stabilizer, benzoic sodium was used.

Comparative Example 19

In Comparative Example 19, components were compounded by the ratio shown in table 7 (the amount of the each component in table 7 is % by weight) and an aqueous ink composition was prepared with the same method as above without the pH adjustor. More concretely, in Comparative Example 19, an aqueous metallic ink composition with blue metallic color was prepared without the pH adjustor.

Comparative Example 20

In comparative Example 20, components were compounded by the ratio shown in table 7 (the amount of the each component in the table 7 is % by weight) and an aqueous ink composition was prepared with the same method as above without the pH adjustor. More concretely, in Comparative Example 20, the pH value was adjusted to be 11 with sodium hydroxide. While allowing it to stand, however, the gas (such as hydrogen gas) was generated from the ink and the ink color blushed. Accordingly, it was impossible to prepare an aqueous metallic ink composition.

TABLE 6

| | Examples | | | | | | | |
|---|---|---|---|---|---|---|---|---|
| | 15 | 16 | 17 | 18 | 19 | 20 | 21 | 22 |
| Aluminum powder pigment 7 | 5 | 5 | 5 | 5 | 5 | 5 | 5 | 5 |
| Pigment base 7 | 30 | 30 | | | 30 | | | 30 |
| Pigment base 8 | | | 30 | 30 | | 30 | 30 | |
| CMC | 2 | 2 | 2 | 2 | 2 | 2 | 2 | 2 |
| Xanthan gum | 0.5 | 0.5 | | | | | | |
| Weran gum | | | 0.4 | 0.4 | | | 0.4 | |
| Rhamzan gum | | | | | 0.4 | 0.4 | | 0.4 |
| Benzotriazole | 0.05 | | 0.1 | | 0.15 | | | |
| Tolyl triazole(4-methyl-benzotriazole) | | 0.1 | | 0.15 | | 0.1 | | |
| Glycelin | 2.5 | 2.5 | 2.5 | 2.5 | 2.5 | 2.5 | 2.5 | 2.5 |
| Propylene glycol | 1.5 | 1.5 | 1.5 | 1.5 | 1.5 | 1.5 | 1.5 | 1.5 |
| Antiseptic-fungicide agent | 0.1 | 0.1 | 0.1 | 0.1 | 0.1 | 0.1 | 0.1 | 0.1 |
| Lubricant | 1.2 | 1.2 | 1.2 | 1.2 | 1.2 | 1.2 | 1.2 | 1.2 |
| Thickening agent stabilizer | 0.6 | 0.6 | 0.6 | 0.6 | 0.6 | 0.6 | 0.6 | 0.6 |
| Water | 56.55 | 56.5 | 56.5 | 56.0 | 56.0 | 56.5 | 56.7 | 56.7 |
| pH | | | | | | | | |
| Before storage | 9.0 | 9.0 | 9.0 | 9.0 | 9.0 | 9.0 | 9.0 | 9.0 |
| 30 days | 8.8 | 8.9 | 8.7 | 8.7 | 8.9 | 8.8 | 8.0 | 8.2 |
| 60 days | 8.6 | 8.8 | 8.5 | 8.6 | 8.7 | 8.8 | 7.5 | 7.7 |
| Viscosity | | | | | | | | |
| 30 days | I | I | I | I | I | I | II | I |
| 60 days | I | I | I | I | I | I | III | III |
| Writing characteristic | | | | | | | | |
| 30 days | I | I | I | I | I | I | II | I |
| 60 days | I | I | I | I | I | I | III | III |

TABLE 7

| | Comparative Examples | |
|---|---|---|
| | 19 | 20 |
| Aluminum powder pigment 7 | 5 | 5 |
| Pigment base 7 | 30 | |
| Pigment base 8 | | 30 |
| CMC | 2 | 2 |
| Xanthan gum | 0.5 | |
| Weran gum | | |
| Rhamzan gum | | 0.4 |
| Benzotriazole | | |
| Tolyl triazole(4-methyl-benzotriazole) | 0.1 | 0.1 |
| Glycelin | 2.5 | 2.5 |
| Propylene glycol | 1.5 | 1.5 |
| Antiseptic-fungicide agent | 0.1 | 0.1 |

TABLE 7-continued

|  |  | Comparative Examples | |
|---|---|---|---|
|  |  | 19 | 20 |
| Lubricant |  | 1.2 | 1.2 |
| Thickening agent stabilizer |  | 0.6 | 0.6 |
| Water |  | 56.5 | 56.6 |
| pH | Before storage | 7.7 | 11.0 |
|  | 30 days | 7.3 |  |
|  | 60 days | 7.0 |  |
| Viscosity | 30 days | III |  |
|  | 60 days |  |  |
| Writing characteristic | 30 days | III |  |
|  | 60 days |  |  |

Estimate of Ink Composition

Each aqueous metallic ink composition prepared in Examples 15 to 22 and Comparative Example 19 was evaluated using the pH, the viscosity stability, the writing characteristic with the pH test, the viscosity stability test, and the writing characteristic test as follows.

pH Test

Each aqueous metallic ink composition prepared in Examples 15 to 22 and Comparative Example 19 was filled in a vessel of polypropylene and the vessel was made airtight. Then, the vessel with the ink composition was allowed to stand or preserved for 30 days and 60 days at 50° C. The pH value was inspected after 30 days storage and 60 days storage. The result is shown in tables 5 and 6. The pH value of before storage is shown in the "before storage", the pH value after 30 days storage is shown in the "30 days" and the pH value after 60 days storage is in shown in the "60 days".

Viscosity Stability Test

Each aqueous metallic ink composition prepared in Examples 15 to 22 and Comparative Example 19 was filled in a vessel of polypropylene and the vessel was made airtight. Then, the vessel with the ink composition was allowed to stand or preserved for 30 days and 60 days at 50° C. Then, the rate of the viscosity change of the ink composition ((the viscosity before the storage/the viscosity after the storage)*100) after 30 days storage and 60 days storage was inspected and the rate of the viscosity change of the ink composition was evaluated on a following basis. The result is shown in "viscosity". The rate of the viscosity change after 30 days storage is shown in the "30 days" and the rate of the viscosity change after 60 days storage is shown in the "60 days". The viscosity is measured by the viscometer of ELD type, and under the condition that the cone: 3°R14 cone, the rotation speed: 0.5 rpm, the temperature: 20° C.

I: The rate of the change is equal to or less than 10%

II: the rate of the change is less than 50%

III: the rate of the change is equal to or more than 50%

Writing Characteristic Test

Each aqueous metallic ink composition prepared in Examples 15 to 22 and Comparative Example 19 was filled in an ink container tube. Then, air bubbles of the ink were removed by way of centrifuging to obtain test samples of ball-point pen. These samples were allowed to stand for 30 days and 60 days at 50° C. in the temperature controlled room with the pen tips oriented upward. Then, the condition of writing and the writing portion were evaluated by visual inspection and the writing characteristic was evaluated. The result was shown in the "writing characteristic" in tables 6 and 7. The writing characteristic after 30 days storage is shown in the "30 days" and the writing characteristic after 60 days storage is shown in the "60 days". In addition, as an ink container tube, the ink container tube for a ball-point pen consisting of a polypropylene hollow shaft which has a tip of ball-point pen made of German silver (the material of ball: hard metal) connected at its edge, was used.

I: no change after storage

II: some thin spots

III: impossible to write

The Result of the Evaluation

In Examples 15 and 20, the aqueous metallic ink composition maintains a pH of 8.0 after having been allowed to stand for 30 days and 60 days at 50° C., there is little change of the viscosity and the writing characteristic don't deteriorate.

In Examples 21 and 22, the aqueous metallic ink composition maintains a pH of 8.0 after having been allowed to stand for 30 days at 50° C. and there is little change of the viscosity and the writing characteristic compared to that of before the storage. But after the 60 days storage, the pH value fell to less than 8.0 and the viscosity increased.

On the other hand, the aqueous metallic ink composition of Comparative Example 19 had the value of pH less than 8.0 when prepared. And after 30 days storage at 50° C., the viscosity increased and writing was impossible.

That is, because the pH value of the aqueous ink of Examples 15 to 22 was adjusted to about 9.0 when prepared (The pH value was within the range of 8.0 to 10), the pH value after 30 days storage in 50° C. was maintained to be more than 8.0. Particularly, the aqueous ink of Examples 15 to 20 contains the pH stabilizer so that the pH value is maintained to be more than 8.5 even after the 60 days storage at 50° C. That is, the change of pH value is very small and the pH value is kept constant.

On the other hand, in the aqueous metallic ink composition without pH adjustor prepared in the Comparative Example 19, because the pH stabilizer is contained, the pH value didn't decrease much after the 30 days storage compared to the pH value before the storage. The pH value also is less than 8.0 (more particularly, 7.7) when prepared, and the viscosity increases compared to before the storage and writing was impossible after the 30 days storage.

Accordingly, to adjust the pH value within the range of 8.0 to 10 makes the viscosity of ink stable and prevents or restrains the viscosity change of ink. Particularly, in the ink composition with the pH stabilizer, the viscosity change of the ink is restrained or prevented for a long time so that the viscosity of the ink is kept constant or approximately constant.

For the reasons stated above, even in the case of composing an usual aqueous ink, the viscosity stability with time can be improved by adjusting the pH value of the ink within the range of 8.0 to 10. Particularly, by using the pH stabilizer, excellent viscosity stability with time can be maintained for a long time.

The present aqueous metallic ink composition has excellent viscosity stability with time because of having the pH of specific value.

The entire disclosure of Japanese Patent Application No.H9-199340 filed on Jul. 8, 1997; No.H9-257635 filed on Sept. 4, 1997; No.H9-311170 filed on Oct. 27, 1997; No.H10-129534 filed on Apr. 22, 1998 including specification, claims and summary are incorporated herein by reference in their entirety.

While the invention has been described in detail with reference to specifically preferred embodiments, those skilled in the art recognize that various modifications can be made without departing from the spirit and scope thereof.

What is claimed is:

1. An aqueous metallic ink composition comprising a metallic powder pigment, a colorant, water, a water-soluble organic solvent, a natural polysaccharide and at least one compound selected from the group consisting of cellulose derivatives, cyclodextrin, cyclodextrin derivatives, a water-soluble soy polysaccharide, water-soluble soy polysaccharide derivatives, and mixtures thereof.

2. An aqueous metallic ink composition as set forth in claim 1, wherein the metallic powder pigment is a brass powder pigment or an aluminum powder pigment.

3. An aqueous metallic ink composition as set forth in claim 1, wherein the natural polysaccharide is at least one compound selected from the group consisting of a microbial polysaccharide or derivatives thereof, a water-soluble vegetable polysaccharide or derivatives thereof, and a water-soluble animal polysaccharide or derivatives thereof.

4. An aqueous metallic ink composition as set forth in claim 1, wherein the cellulose derivative is at least one compound selected from the group consisting of carboxymethyl cellulose or salts thereof, methyl cellulose, hydroxyethyl cellulose, hydroxypropyl cellulose, hydroxypropylmethyl cellulose, and hydroxypropylethyl cellulose.

5. An aqueous metallic ink composition as set forth in claim 1, wherein the natural polysaccharide is contained in an amount of 0.01% to 4% by weight and cellulose derivatives are contained in an amount of 0.01% to 40% by weight relative to the total amount of the ink composition.

6. An aqueous metallic ink composition as set forth in claim 1, wherein the cyclodextrin or cyclodextrin derivatives are at least one compound selected from the group consisting of α-cyclodextrin, β-cyclodextrin, γ-cyclodextrin and derivatives of these cyclodextrin.

7. An aqueous metallic ink composition as set forth in claim 1, wherein the natural polysaccharide is contained in an amount of 0.01% to 4% by weight and the cyclodextrin or cyclodextrin derivatives are contained in an amount of 0.1% to 40% by weight relative to the total amount of the ink composition.

8. An aqueous metallic ink composition as set forth in claim 1, wherein the natural polysaccharide is contained in an amount of 0.01% to 4% by weight and the water-soluble soy polysaccharide or water-soluble soy polysaccharide derivatives are contained in an amount of 0.50% to 20.0% by weight relative to the total amount of the ink composition.

9. An aqueous metallic ink composition as set forth in claim 1, further comprising an anionic polymer, and the pH value of the ink composition is maintained within the range of 8.0 to 10.

10. An aqueous metallic ink composition comprising a metallic powder pigment, a pigment and an anionic polymer, and the pH value of the ink composition is maintained within the range of 8.0 to 10.

11. An aqueous metallic ink composition as set forth in claim 10, wherein the anionic polymer is at least one compound selected from the group consisting of acrylic resins, styrene-acrylic acid copolymer, polymaleic acid, styrene-maleic copolymer, polyvinyl pyrrolidone, ester-acrylic acid copolymer and resins having carboxyl group.

12. An aqueous metallic ink composition as set forth in claim 10, further comprising a pH stabilizer.

13. An aqueous metallic ink composition as set forth in claim 12, wherein the pH stabilizer is benzotriazole or derivatives thereof.

14. An aqueous metallic ink composition as set forth in claim 10, further comprises a thickening agent.

15. An aqueous metallic ink composition prepared by mixing a metallic powder pigment, a colorant, water, water-soluble organic solvent, a natural polysaccharide and at least one compound selected from the group consisting of cellulose derivatives, cyclodextrin, cyclodextrin derivatives, a water-soluble soy polysaccharide, water-soluble soy polysaccharide derivatives, and mixtures thereof.

16. An aqueous metallic ink composition as claimed in claim 15, wherein the metallic powder pigment is a brass powder pigment or an aluminum powder pigment.

* * * * *